United States Patent
Bazrafkan et al.

(10) Patent No.: US 10,915,817 B2
(45) Date of Patent: Feb. 9, 2021

(54) METHOD OF TRAINING A NEURAL NETWORK

(71) Applicant: FotoNation Limited, Galway (IE)

(72) Inventors: Shabab Bazrafkan, Galway (IE); Joe Lemley, Galway (IE)

(73) Assignee: FotoNation Limited, Galway (IE)

( * ) Notice: Subject to any disclaimer, the term of this patent is extended or adjusted under 35 U.S.C. 154(b) by 843 days.

(21) Appl. No.: 15/413,312

(22) Filed: Jan. 23, 2017

(65) Prior Publication Data
US 2018/0211164 A1 Jul. 26, 2018

(51) Int. Cl.
G06N 3/08 (2006.01)
G06N 3/04 (2006.01)

(52) U.S. Cl.
CPC ........... G06N 3/088 (2013.01); G06N 3/0454 (2013.01)

(58) Field of Classification Search
None
See application file for complete search history.

(56) References Cited

U.S. PATENT DOCUMENTS 7,062,476 B2    6/2006 Mims

FOREIGN PATENT DOCUMENTS

| WO | 2017/032468 A1 | 3/2017 |
| WO | 2017/108222 A1 | 6/2017 |
| WO | 2017/129325 A1 | 8/2017 |

OTHER PUBLICATIONS

Gulm Perarnau et al., Invertible Conditional GANs for image editing, Nov. 19, 2016, NIPS 2016 (Year: 2016).*
Ian J. Goodfellow et al., Generative Adversarial Nets, Jun. 10, 2014 (Year: 2014).*
Ilya Tolstikhin et al., AdaGAN: Boosting Generative Models, Jan. 9, 2017, (Year: 2017).*
Levent Karacan et al., Learning to Generate Images of Outdoor Scenes from Attributes and Semantic Layouts, Dec. 1, 2016 (Year: 2016).*
Alec Radford et al., Unsupervised Representation Learning with Deep Convolutional Generative Adversarial Networks, Jan. 7, 2016, ICLR 2016 (Year: 2016).*

(Continued)

Primary Examiner — Ann J Lo
Assistant Examiner — Charles C Kuo
(74) Attorney, Agent, or Firm — Lee & Hayes, P.C.

(57) ABSTRACT

Training a target neural network comprises providing a first batch of samples of a given class to respective instances of a generative neural network, each instance providing a variant of the sample in accordance with the parameters of the generative network. Each variant produced by the generative network is compared with another sample of the class to provide a first loss function for the generative network. A second batch of samples is provided to the target neural network, at least some of the samples comprising variants produced by the generative network. A second loss function is determined for the target neural network by comparing outputs of instances of the target neural network to one or more targets for the neural network. The parameters for the target neural network are updated using the second loss function and the parameters for the generative network are updated using the first and second loss functions.

18 Claims, 8 Drawing Sheets

(56) References Cited

OTHER PUBLICATIONS

Diederik P. Kingma, ADAM: A Method for Stochastic Optimization, Jul. 23, 2015, ICLR 2015 (Year: 2015).*
W. Kinzel, I. Kanter, "Neural Cryptography", Proceedings of the 9th international conference on neural information processing, vol. 3. 2002.
I. Goodfello, J. Pouget-Abadie, M. Mirza, B. Xu, D. Warede-Faley, S. Ozair, A. Courville, Y. Bengio "Generative Adversarial Nets (GAN)", Advances in Neural Information Processing Systems, 2014 pp. 2672-2680.
ADAM: A Method for Stochastic Optimization, Proceedings of the 3rd International Conference on Learning Representations (ICLR), Dec. 22, 2014).

* cited by examiner

Figure 8
Figure 9
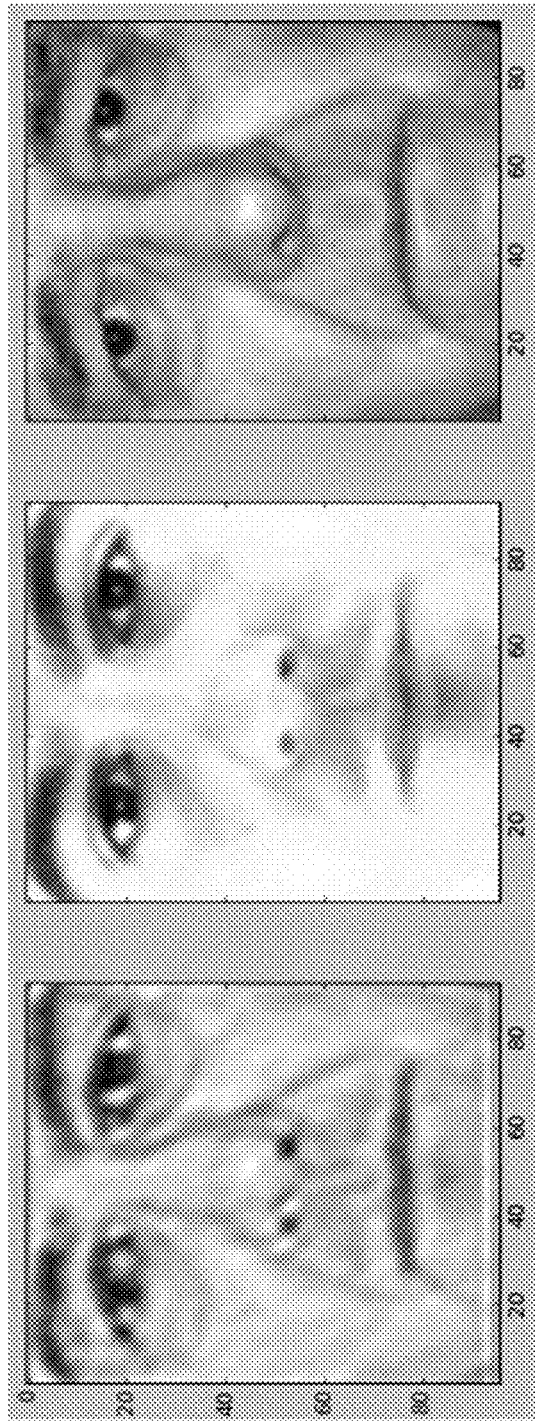
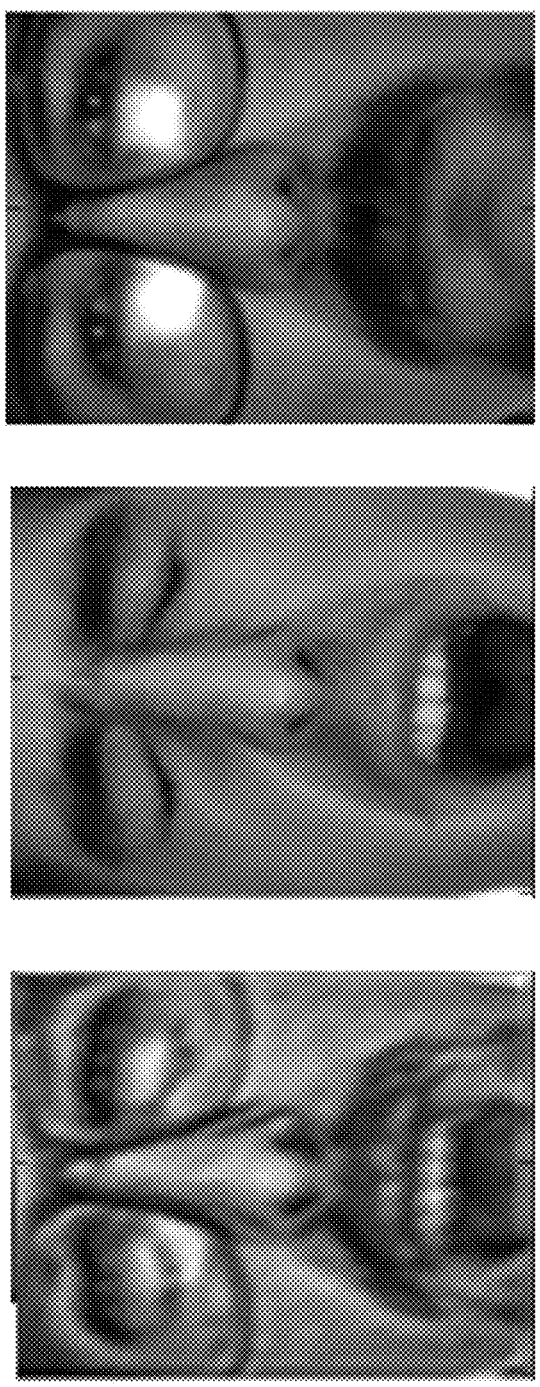

METHOD OF TRAINING A NEURAL NETWORK

RELATED APPLICATIONS

The present invention relates to co-filed U.S. application Ser. No. 15/413,283 entitled "A method for synthesizing a neural network", PCT Application No. PCT/EP2016/060827 filed 13 May 2016, PCT Application No. PCT/EP2016/074519 filed 12 Oct. 2016 and PCT Application No. PCT/EP2016/081776 filed 19 Dec. 2016, the disclosures of which are incorporated by reference.

FIELD

The present invention relates to a method of training a neural network.

BACKGROUND

A problem in the field of deep learning is that there is simply not enough quality labelled data to train neural networks. For example, there are limited training sets of images of faces labelled as including a subject smiling, blinking, wearing glasses or of a given gender or age.

Some approaches to avoiding this problem in training networks include U.S. Pat. No. 7,062,476, Mims, which discloses using one neural network, a teacher, to train another, a student, in such a way as to mimic its output in order to classify the same material.

W. Kinzel, I. Kanter, "Neural Cryptography", Proceedings of the 9$^{th}$ international conference on neural information processing, vol 3. 2002 discloses a similar concept for neural cryptography which uses a neural key exchange mechanism to secure communication. The method shows promise in the future because it is not vulnerable to the varieties of cryptographic attacks that are theorized to become feasible with quantum computers.

I. Goodfellow, J. Pouget-Abadie, M. Mirza, B. Xu, D. Warde-Farley, S. Ozair, A. Courville, Y. Bengio "*Generative Adversarial Nets (GAN)*", Advances in Neural Information Processing Systems, 2014 pp. 2672-2680, discloses synthesizing examples of observed data in an unsupervised way by use of competing networks.

For example, using the analogy of police vs counterfeiters: a first network A (a counterfeiter) attempts to trick a second discriminator network B (the police) into thinking that an image artificially generated by the counterfeiter using a generative model is legitimate. The second network attempts to learn how to detect the counterfeits in a min-max fashion. The goal is that through this competitive process, the counterfeiter network will be able to produce images that are indistinguishable from real images.

Specifically, the first generative model network generates samples by passing random noise through a multi-layer perceptron. The second discriminator network is also based on a multi-layer perceptron. The models are trained using back-propagation and dropout.

Thus, generative adversarial networks, are unsupervised learning tools (they do not use class labels and instead they require large amounts of unlabelled data) and use competition to generate an image which is then used to make images that are "similar" to other images that a second discriminator network has seen before.

Another technique for addressing this problem is called augmentation. Augmentation is the process of supplementing a training dataset, with similar data created from the information in that dataset. The use of augmentation in deep learning is ubiquitous, and when dealing with images, this can include the application of rotation, translation, blurring and other modifications to existing labelled images in order to improve the training of a target network. Augmentation thus serves as a type of regularization, reducing the chance of overfitting by adding information to the training dataset for a target network.

Augmentation is typically performed by trial and error, and I. Goodfellow, Y. Bengio and A. Courville, "*Deep learning*", MIT Press, 2016 discloses that the choice of augmentation strategy can be more important than the type of network architecture used.

For example, Keras, a high-level neural networks library, written in Python and capable of running on top of either TensorFlow or Theano, has a built-in method to randomly flip, rotate, and scale images during training. However, not all of these methods will improve performance and should not be used "blindly". For example, on mnist, a well-known hand written number dataset, if one adds rotation to augment images, then the target network will be unable to distinguish properly between hand written "6" and "9" digits. Likewise a network that uses deep learning to classify or interpret road signs may become incapable of discerning left and right arrows if a training set had been augmented using indiscriminate flipping of images.

More sophisticated types of augmentation, such as selectively blending images or adding directional lighting rely on expert knowledge. It will be appreciated that blending several samples from a training dataset in order to highlight their mutual information is not a trivial task: which samples should be mixed together, how many of them and how they should be mixed is a big problem in data augmentation using blending. Besides intuition and experience, there is no universal method that can determine in advance if any specific augmentation strategy will improve the training of a target neural network.

Since training deep neural networks is a time consuming process, this means only a limited number of augmentation strategies will likely be attempted before deployment of a target network.

SUMMARY

According to the present invention there is provided a method of training a neural network according to claim 1.

Embodiments of the invention learn an optimal augmentation strategy for a specific dataset.

Some embodiments include a selector disposed between the augmenting network and the target network that decides, based on a probability $F(L_A)$ if augmented data or un-augmented data will be passed to the target network.

The results of experiments show less over fitting and higher accuracy when using the present invention by comparison to training a target network based on a given un-augmented dataset or an un-intelligently augmented dataset.

BRIEF DESCRIPTION OF THE DRAWINGS

Embodiments of the invention will now be described, by way of example, with reference to the accompanying drawings, in which:

FIGS. 8 and 9 show respective further exemplary male images (a) created by a learned combination of labelled images (b), (c).

DESCRIPTION OF THE EMBODIMENTS

Figure 1:
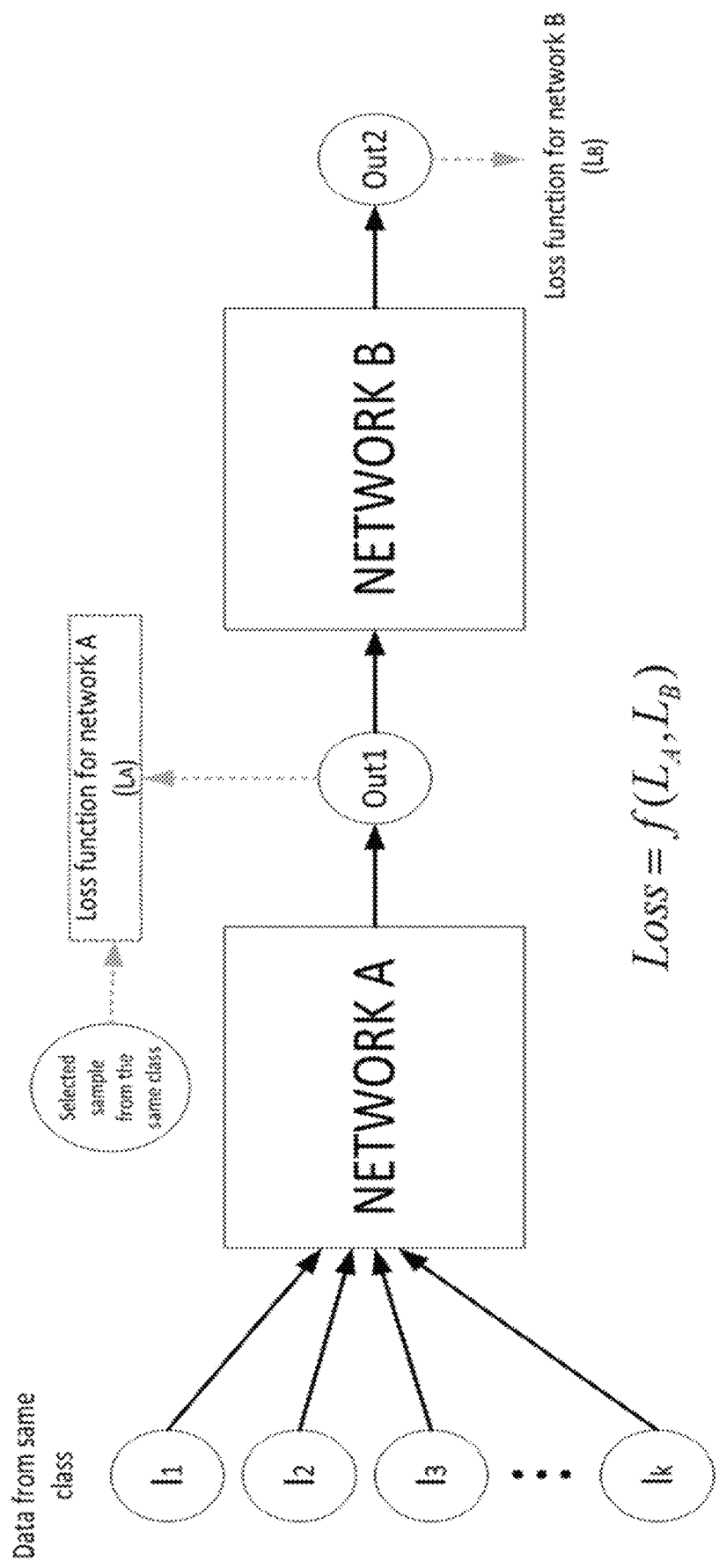
FIG. 1 shows an augmenting network A operating on an image set I for training a target network B according to a first embodiment of the present invention.

Referring now to FIG. 1, a method for training a neural network according to an embodiment of the present invention uses an augmenting network (network A) to learn the best sample blending/generation for the specific problem in hand. This network A is placed before a target network designed for the problem (network B), so that network A augments a dataset, $I_1 \ldots I_k$, so that it can provide augmented samples i.e. samples other than those of the dataset $I_1 \ldots I_k$, to network B. Thus, network A learns the best data augmentation to increase the training accuracy of network B, even letting network A come up with non-intuitive but highly performing augmentation strategies.

During each training epoch, an instance of Network A accepts at least one sample, N≥1, from a batch of samples of the same class in the dataset, $I_1 \ldots I_k$ (in one example, the samples comprise images of male subjects) and generates Out1, a new sample in the same class so that this new sample reduces the loss function for network B. In the example of FIG. 1, where the dataset comprises images of male subjects, Network B is designed to perform gender classification and so it produces a single output ($L_B$) indicating the likelihood of an input image containing for example, a male image.

The only constraint on network A is that the input and output of this network should be the same data type. Note that the present invention is applicable to any form of input not alone images. The input can for example comprise a feature vector or time-series (like sounds, medical data, etc) as long as this is labelled. For example if several P channel images are fed to the network A, the output should be a single P channel image. Thus, image channels can be from any colour space including monochrome, intensity only images, RGB, YUV, LAB etc. Indeed processed versions of images including Integral Image (II); |²| image; histogram of gradients (HOG) image etc. can form one or more of the P channels for any given image. Also note that the channel information need not be limited to visible wavelengths and could represent infra-red information. Details for these and other forms of image can be found in PCT Application Nos. PCT/EP2016/060827 filed 13 May 2016 (Ref: FN-469-PCT) and PCT/EP2016/074519 filed 12 Oct. 2016 (Ref: FN-470-PCT) the disclosures of which are incorporated by reference.

Selection of the samples from the dataset, $I_1 \ldots I_k$ to be provided to Network A can be random or can be done in a more sophisticated or intelligent way to get the best results.

Network A is a neural network, such as a generative model network of the type employed by Goodfellow et al referenced above, with the difference that: an overall loss function for network A used for updating the parameters of network A is influenced by the loss function for network B in a back propagation step; and any instance of network A can accept multiple samples as input simultaneously instead of just one at a time. Note however that Network A is supervised because samples provided to the network are labelled according to their class, whereas generative models such as those employed by Goodfellow et al referenced above are unsupervised.

In the embodiment, the direct loss function $L_A$ for each instance of network A accepts Out1 and another image Ii from the same class in the dataset $I_1 \ldots I_k$ as input and can be calculated using a mean square error or any similar suitable measure. These measures can then be combined to provide the loss function $L_A$ for a batch.

The loss function $L_B$ for network B can for example be a categorical cross-entropy between the outputs of network B and the target values for the classifier for a batch, although other functions such as binary cross-entropy, squared error or binary hinge loss could be employed according to the task for network B.

In the example of FIG. 1, each instance of Network B will only have one output, but as will be explained below in other implementations, Network B can be a multi-class classifier and so can provide a plurality of outputs, for example, network B could be both a male and female classifier, producing an output for each in response to an input image.

The overall loss function error used for training network A is $f(L_A, L_B)$ where f is a function whose output is a transformation of $L_A$ and $L_B$. In one embodiment the overall loss function is $\alpha L_A + \beta L_B$ where $\alpha=0.3$ and $\beta=0.7$. Nonetheless, the overall loss function could be an epoch dependent function i.e. the function or the function parameters could change with training epoch number.

Using back propagation of the loss function from network B causes the data generated by network A to converge to the best choices to train network B for that specific task, while at the same time network A is also controlled by loss function $L_A$ so that its outputs are similar to other members of its class within the dataset $I_1 \ldots I_k$.

In the training process, the loss function error back propagates from network B to network A. This tunes network A to generate the best augmentations for network B that can be produced by network A.

After training finishes, Network A is cut out of the model and Network B can then be used with the parameters determined during the training phase.

Further improvements can be made to the approach of FIG. 1, taking into account that in that implementation, Network B does not see the actual data $I_1 \ldots I_k$ from the dataset (only the augmented data is fed to the network in the training process).

Figure 3:
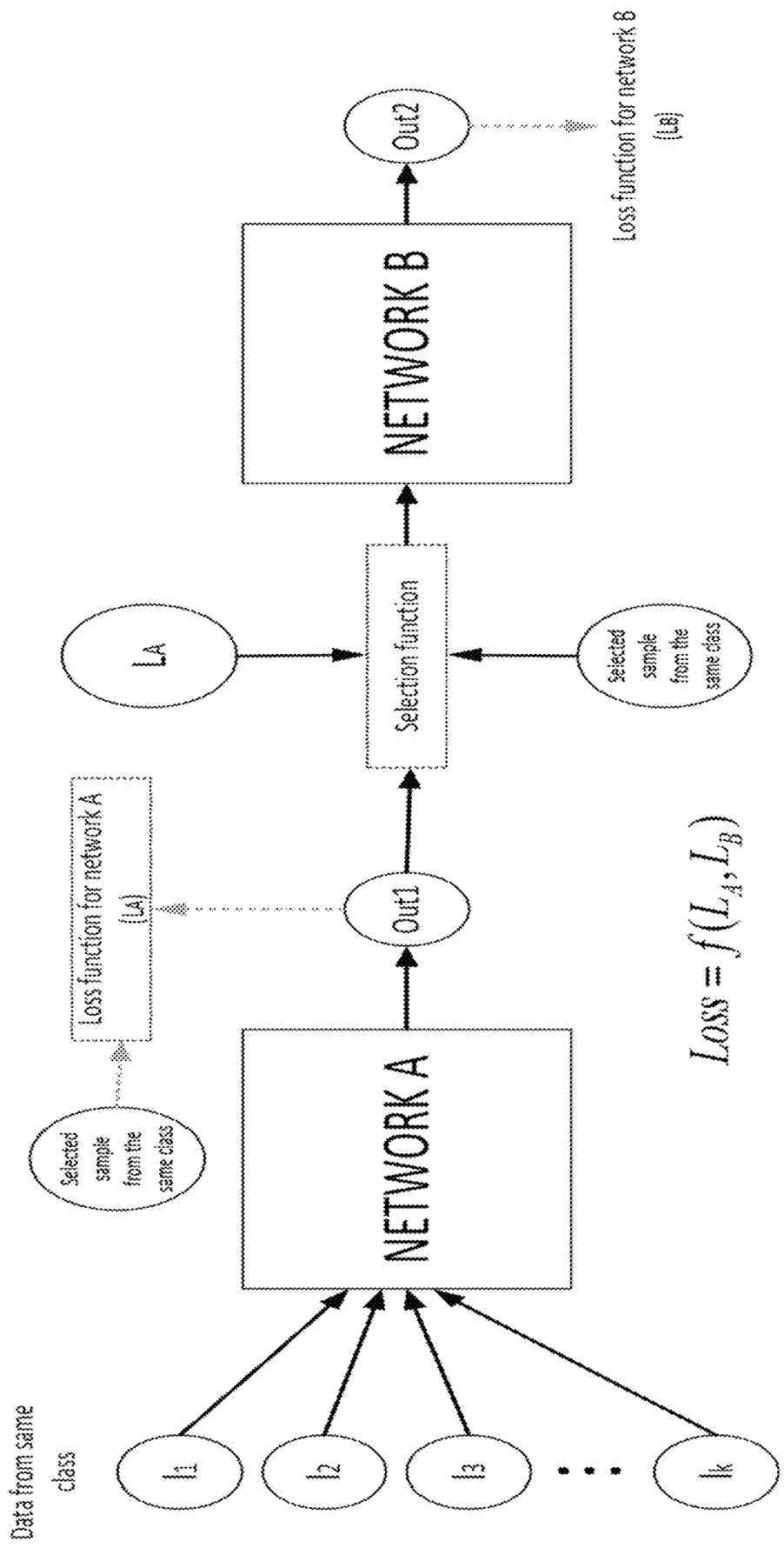
FIG. 3 shows an augmenting network A operating on an image set I for training a target network B according to a further embodiment of the present invention.

Referring to FIG. 3, in a second embodiment, a unit "selection function" is placed just before Network B. In embodiments, the selection function selects one of its inputs with a probability based on the value of loss function $L_A$. If the loss function ($L_A$) is high, the probability that the augmented image Out1 is selected is low. This gives a chance for non-augmented data from the dataset $I_1 \ldots I_k$ to participate in the training process for Network B. In this case, as network A trains, it is more likely its augmented samples will be provided to Network B.

In a simpler implementation, the selection function is 50/50, so that alternate instances of network B use augmented samples from network A and samples from the dataset $I_1 \ldots I_k$.

As an alternative to using the selector function, after training the network B using just augmented data provided by network A, one can then ignore network A and fine tune Network B using the non-augmented original dataset.

Figure 4:
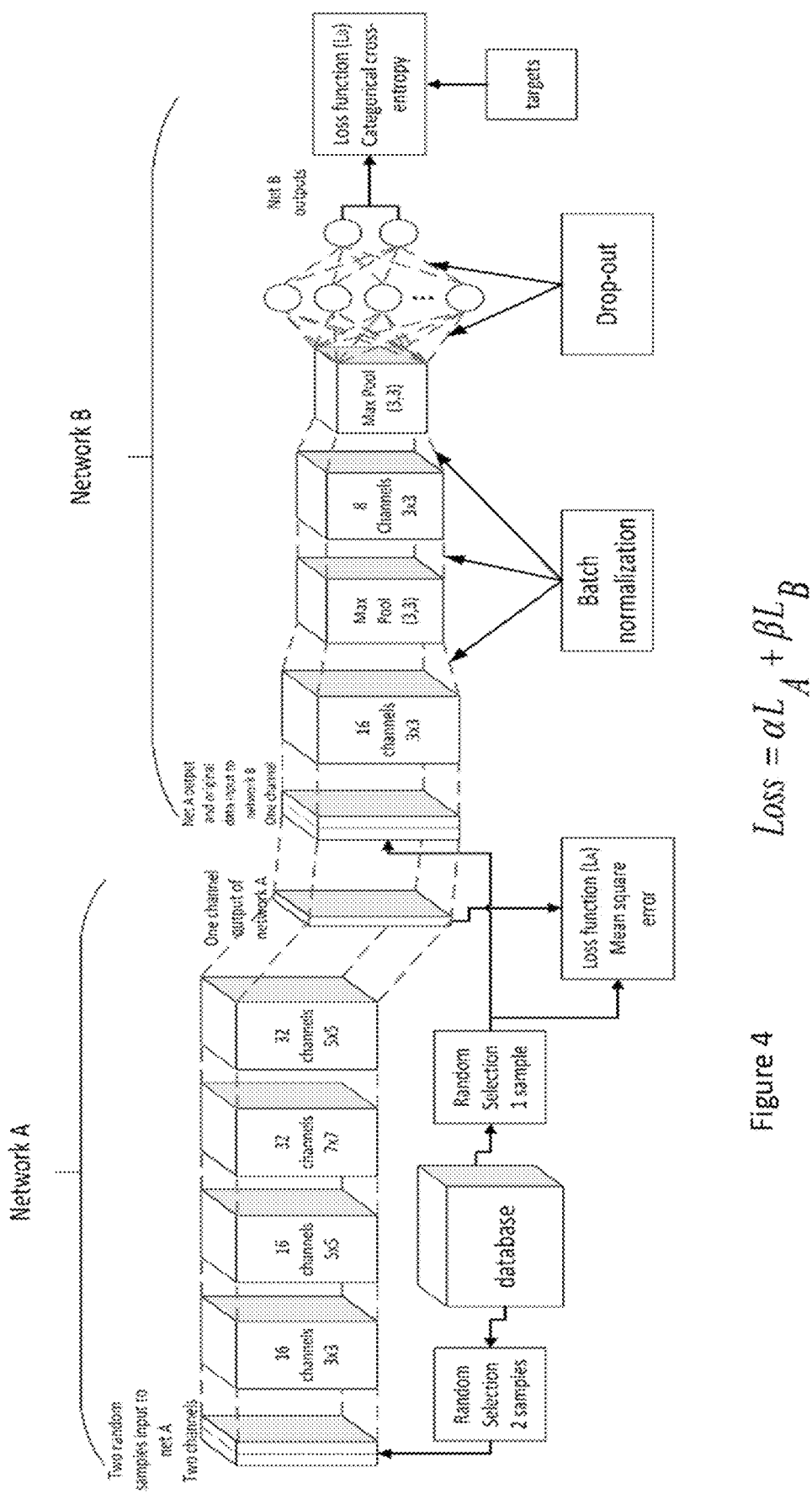
FIG. 4 shows exemplary network structures for networks A and B in more detail.

FIG. 4 shows in more detail an exemplary structure of networks A and B employed within the system illustrated in FIG. 3. These network structures could equally be deployed within the system of FIG. 1.

Figure 2:
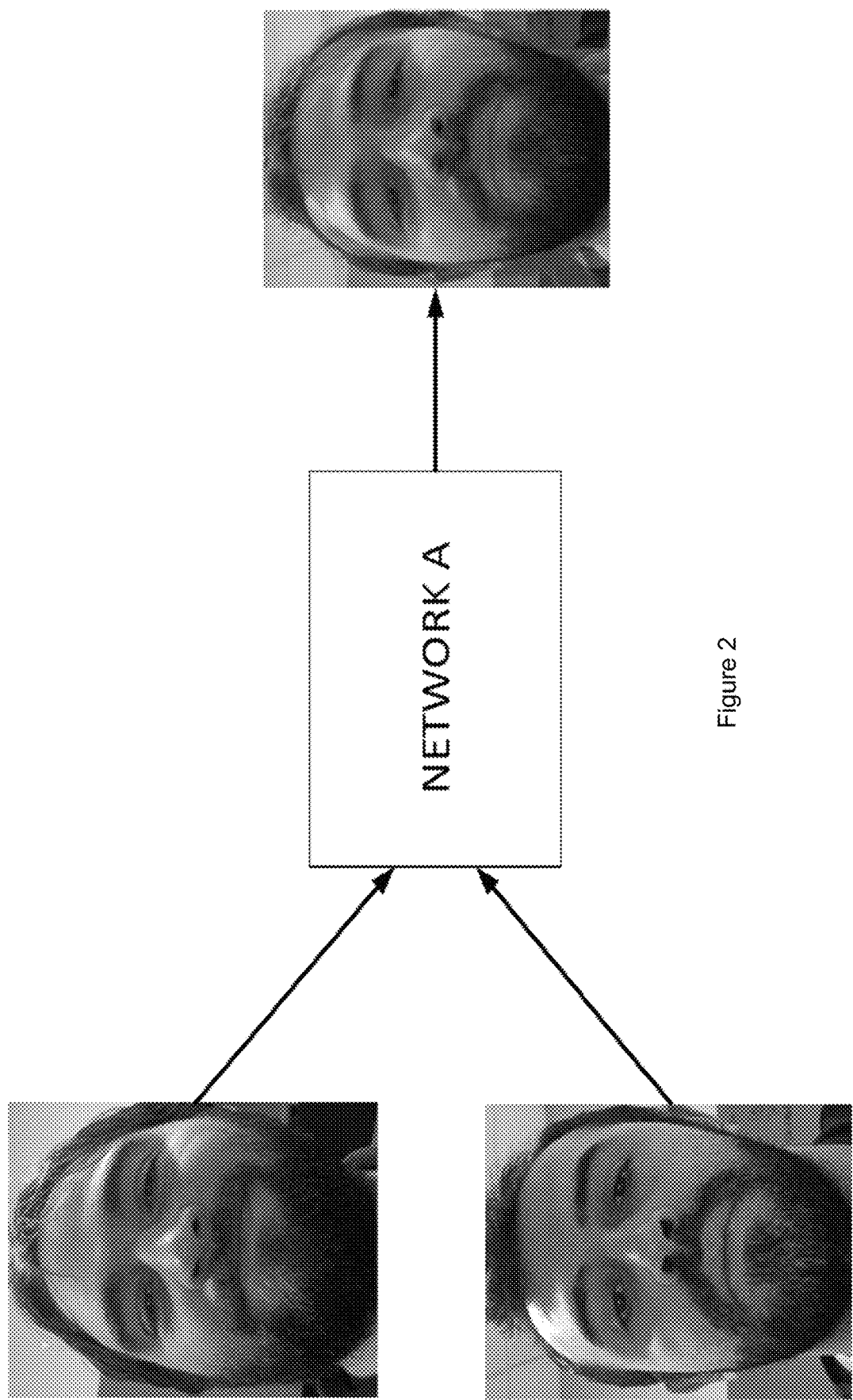
FIG. 2 shows exemplary male images being blended by the network A.

As shown in FIG. 4:
1. In this example, as illustrated in FIG. 2, each instance of the generative network A is fed two images randomly selected from the same class in a dataset 70, step 60. These two samples are merged, blended, concatenated or otherwise combined into a single sample and this is processed by the instance of network A. (Again, the selection of images could be intelligent rather than random.) Note that if the two selected images are N-channel images then these are combined into a set of 2*N-channel images. As indicated, other generative networks might require only one sample image or possibly more than 2 sample images.
2. The new combined image is fed into the network A. Network A is a fully convolutional network which accepts images as the input and gives images of the same size at the output.
3. Another image is selected from the same class in the dataset 70, step 62. In the example, this sample selection is random, but as mentioned this selection can be intelligent—in any case, this image should not be any of those images selected in step 60.
4. The loss function for network A ($L_A$) is calculated using a mean square error between the randomly selected images for a batch and the outputs of instances of network A, step 64. It will be appreciated that loss functions other than mean square error could also be used.
5. In this example, the output of network A and the target image selected in step 62 are fed into network B as inputs. As mentioned, in step 66, one or other of these images can be selected for processing through an instance of network B and this selection can be done on 50/50 basis or the selection can be a function of the loss function of network A.
6. In the example, Network B is a typical deep neural network with two convolutional layers followed by batch normalization and max-pooling steps after each convolutional layer. Unlike FIG. 1 where only one output is provided, in this case two fully connected layers are placed at the end of the network. The first layer has 1024 units and the second dense layer is made of two units as the output of network B—in this example, one output would represent a likelihood of the input image being male, with the other representing a likelihood of the input image being female. In this case, the targets for these outputs could be 1 and 0 with 1 for male, so causing one of the network B output neurons to fire, and with 0 for female, so causing the other neuron to fire. (As will be appreciated only 1 such output need be provided for a single classifier.) In any case, each dense layer takes advantage of drop-out technique in order to avoid over-fitting.
7. In this example, the loss function $L_B$ of network B is the categorical cross-entropy between the outputs for the augmented image provided by Network A and/or the dataset $I_1 \ldots I_k$ and the targets for the fully-connected layer outputs for a batch.
8. The total loss of the whole model is $\alpha L_A + \beta L_B$, which is a linear combination of the loss functions of the two networks. In one example, $\alpha=0.3$ and $\beta=0.7$ and this is fed back to network A for the subsequent batch.

In this regard, typically when training a neural network, a batch of data X(T) is given to the network and these are used to train instances of network A in parallel and to subsequently train instances of network B in parallel, the instances of network B being fed (at least partially) with augmented samples generated by the instances of network A from processing the samples of batch X(T). For example if a batch size of 100 is chosen, 100 images are fed into a given network in one go and the network parameters are updated based on the loss function(s) resulting from these 100 inputs. For example, in the implementation of FIG. 4 where a 50/50 selector is employed, half of the batch for network B comes from the outputs of the network A processing its samples from the batch and the other half comes from the original database 70. (For ease of implementation, the samples from the original database chosen for calculating the loss function for network A can also be used as the input for network B.) In another words, 50 pairs of images from a batch are fed to respective instances of network A so that these instances of network A provide 50 images at their outputs. These 50 images are put in a single batch with 50 original images from the database $I_1 \ldots I_k$. These 100 images are fed to respective instances of network B as one batch and the loss for network B is calculated based on the gender that it predicts for this batch of images. The parameters for network B are updated based on the loss function for network B, whereas the parameters for network A are updated based on the loss functions for network A and network B. A training epoch may comprise a number of batches . . . X(T−1), X(T), X(T+1) . . . being processed in sequence with each batch being used to train network A using the loss functions from networks A and B, and to train network B using the augmented images generated while training network A and also original images, which together generate the loss for network B.

Figure 5:
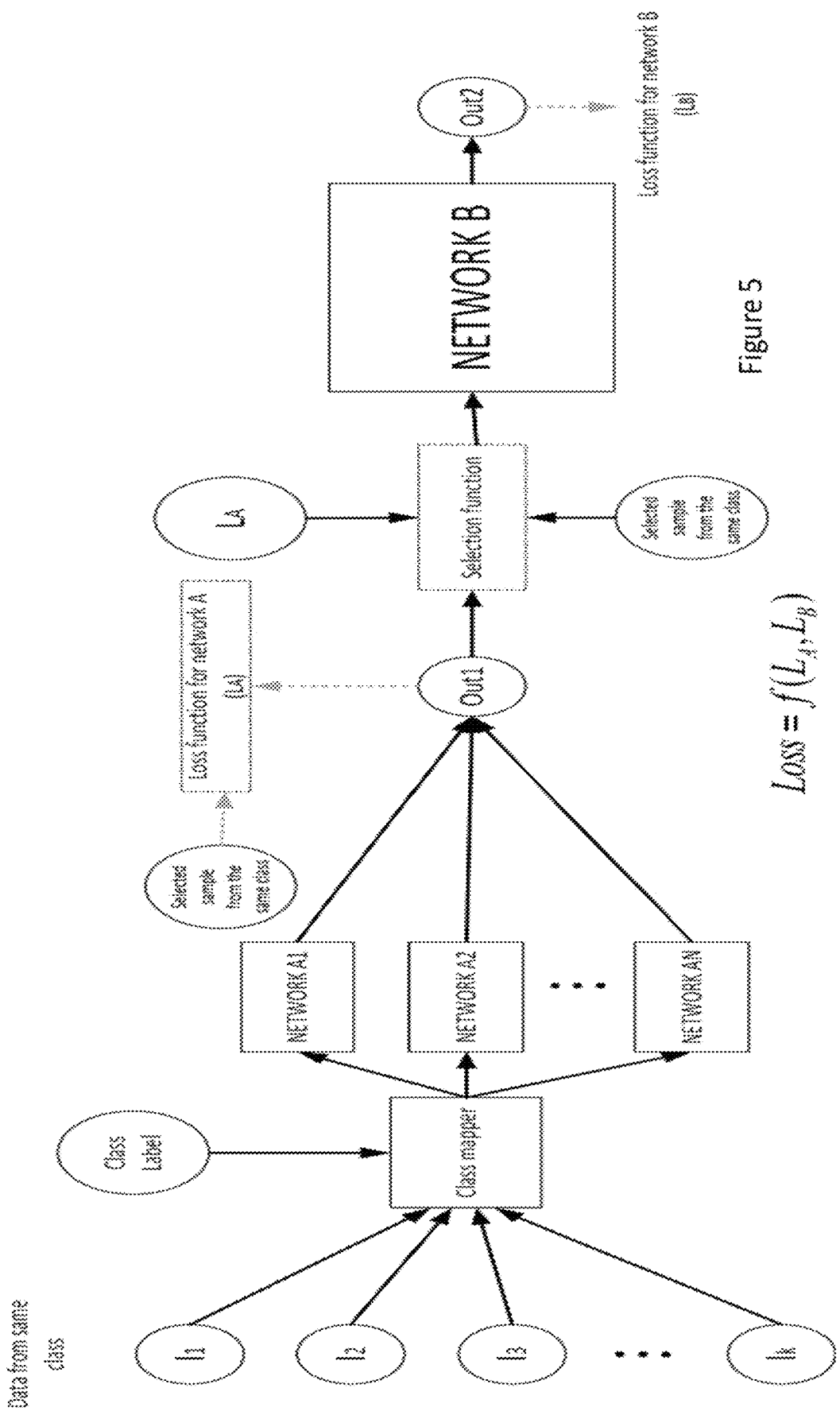
FIG. 5 shows an augmenting network A operating on an image set I for training a multi-class classifier target network B according to a still further embodiment of the present invention.

Referring now to FIG. 5, in this case, network B is multi-class classifier having respective outputs for each class, and for each class N, there is provided a respective augmenting network A1 to AN. In this case, each class might correspond with an image exhibiting an emotion from a class of emotions; or simply a male/female classifier. A class mapper unit maps its input to one of N augmenting networks A1 to AN based on a class label. In this case, each augmenting network can train separately from the others so increasing the precision of the augmented samples being produced by each network A1 . . . AN.

Figure 6:
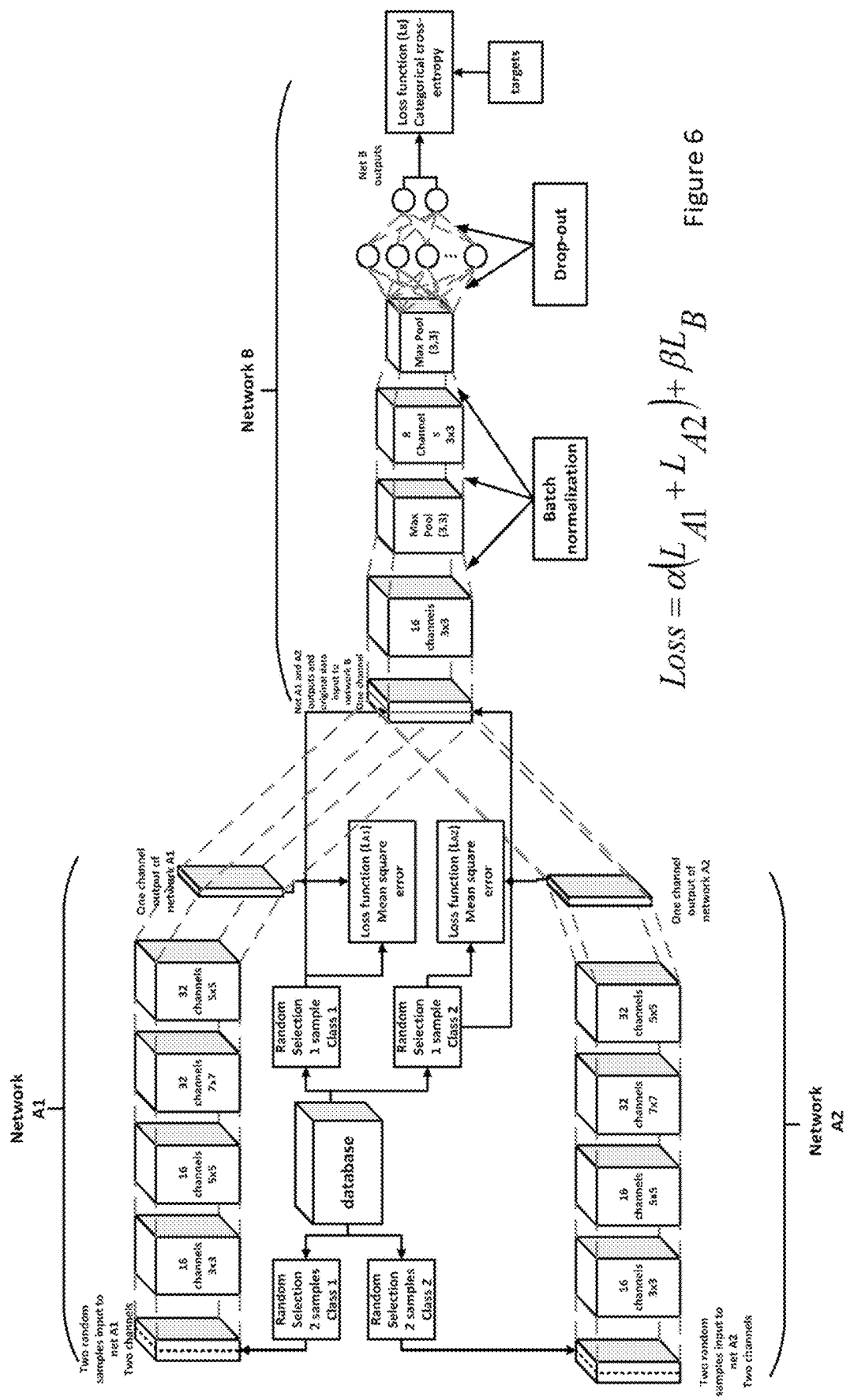
FIG. 6 shows exemplary network structures for a two-class network B shown in FIG. 5.

FIG. 6 shows in more detail an implementation of such a network with a dual classifier Network B where reference numerals corresponding to the components of FIG. 4 are used for the components of networks A1 and A2.

In this case, when updating parameters of network B, samples are selected at step 66' from a batch X(T) drawn from first and second classes in the database 70 and either augmented with respective networks A1 and A2 or selected directly from the database 70 as before, and the loss function is calculated as $L_B$.

For updating parameters of A1, the samples from batch X(T) are fed into network B from both network A1 and A2 and the loss $L_B$ for network B is calculated. The loss $L_{A1}$ for network A1 is calculated only for the samples of the first class fed into network A1, and the overall loss for A1 is $\alpha*L_{A1}+\beta*L_B$, with $L_B$ being loss function for training network B.

For updating parameters of A2, the samples from batch X(T) are fed into network B from both network A1 and A2 and the loss $L_B$ for network B is calculated. The loss $L_{A2}$ for network A2 is calculated only for the samples of the second class fed into network A2, and the overall loss for A2 is $\alpha*L_{A2}+\beta*L_B$, with $L_B$ being loss function for training network B.

Thus, there are three different loss functions with three different data feeding paths. So for a male/female classifier network B, this guarantees that network A1 is producing images that are male and far from female at the same time and vice versa for network A2.

The complete model shown in any of FIGS. 1, 3-6 can be trained using Nestrov Momentum technique, for example, with a learning rate 0.01 and momentum 0.9, or any other training method such as Stochastic Gradient Descent (SGD), ADAM (see "ADAM: A Method For Stochastic Optimization", Proceedings of the 3rd International Conference on Learning Representations (ICLR), 22 Dec. 2014), RMSPROP (see Tieleman, T. and Hinton, G., Lecture 6.5—rmsprop, COURSERA: Neural Networks for Machine Learning, 2012) etc.

Figure 7:
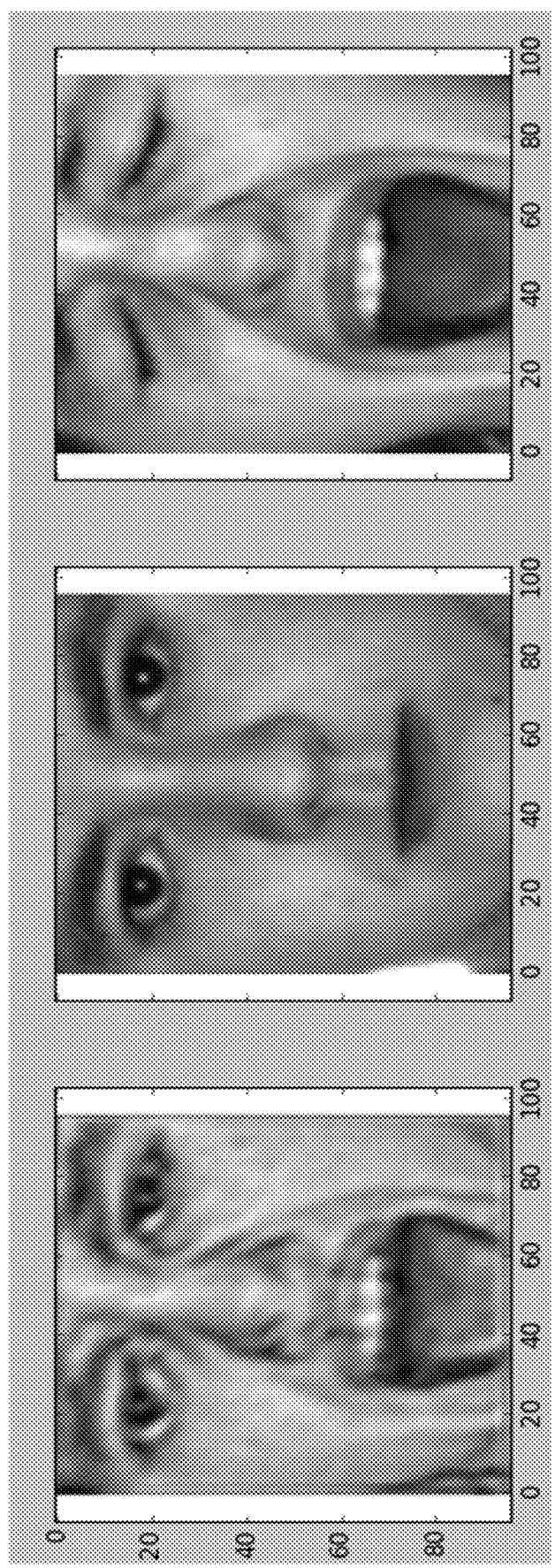
FIG. 7 shows an exemplary male image (a) created by a learned combination of labelled images (b), (c)

FIG. 7 shows an exemplary output of network A, image (a), representing a sample of the class 'male' which does not appear in the dataset. Image (a) is a merged image of the other two (b) and (c). An image such as image (a) can help increase the accuracy of network B. The image is not produced to be an ideal approximation of a face but instead contains features that can help network B better generalize the concept of gender the task for which it is being trained.

Notice that in FIG. 7, image (a) was created with an open mouth, from image (c), and open eyes, from image (b), but it is the same gender as both images. We speculate that network A may have needed to create images that would allow network B to become invariant to facial expression so it could better focus on the gender classification task. Note that the quality of the face image produced by network A does not matter—only its ability to help network B better generalize.

Some further examples of outputs of network A are shown in FIGS. 8 and 9. In all these figures, image (a) on the left side is the merged image of the other two images (b) and (c) produced by network A.

Any network similar to network B can be trained in accordance with the above described method for example, a network synthesized according to the method described in co-filed U.S. application Ser. No. 15/413,283 entitled "A method for synthesizing a neural network".

Once trained according to the above method, such networks can advantageously be executed on hardware such as described in PCT Application No. PCT/EP2016/081776 filed 19 Dec. 2016 (Ref: FN-481-PCT). Here convolution and fully connected layer information is loaded into a neural network engine to perform image processing as required.

Note that while the above embodiments relate to classification tasks, the invention is equally applicable where selective blending of sample features improves performance.

The invention claimed is:

1. A method of training a target neural network comprising:
a) providing a first batch of samples of a class to respective instances of a generative neural network, each instance of said generative neural network providing a variant of said sample in accordance with parameters of said generative neural network;
b) comparing each variant provided by said generative neural network with another sample of said class to provide a first loss function for said generative neural network;
c) determining to include one or more variants provided by said generative neural network or one or more samples of said class in a second batch of samples based at least in part on a probability;
d) including a proportion of the one or more variants provided by said generative neural network and the one or more samples of said class in the second batch of samples based at least in part on the determining, wherein said proportion varies from the second batch of samples to a third batch of samples;
e) providing the second batch of samples to said target neural network, at least one sample of said second batch of samples comprising the one or more variants produced by said generative neural network;
f) determining a second loss function for said target neural network by comparing outputs of instances of said target neural network to one or more targets for said target neural network;
g) updating the parameters for said target neural network using said second loss function; and
h) updating the parameters for said generative neural network using said first loss function for said generative neural network and said second loss function for said target neural network.

2. A method according to claim 1 wherein said proportion increases or decreases with a successive repetition of steps a) to h).

3. A method according to claim 1 wherein said second batch of samples comprises a proportion of variants less than all variants provided by said generative neural network, the proportion based at least in part on the first loss function for said generative neural network.

4. A method according to claim 1 wherein said target neural network is a multi-class classifier, said generative neural network is a first generative neural network, and said method further comprises:
providing a third batch of samples of a second class to respective instances of a second generative neural network, each instance of said second generative neural network providing a variant of said sample in accordance with the parameters of said second generative neural network;
comparing each variant produced by said second generative neural network with another sample of said second class to provide a loss function for said second generative neural network;
wherein said second batch of samples provided to said target neural network further comprises said variants produced by said second generative neural network; and
updating the parameters for said second generative neural network using said loss function for said second generative neural network and said second loss function for said target neural network.

5. A method according to claim 1 wherein a combined loss function for said generative neural network is $\alpha L_A+\beta L_B$ where $L_A$ is said first loss function and $L_B$ is said second loss function and said combined loss function is used to update the parameters of said generative neural network.

6. A method according to claim 5, wherein $\alpha$ is less than or equal to 0.3 and $\beta$ is greater than or equal to 0.7.

7. A method according to claim 5 where a and change with a successive repetition of steps a) to h).

8. A method according to claim 1 wherein said target neural network comprises a fully-connected layer providing said outputs.

9. A method according to claim 1 wherein each sample comprises an image comprising one or more channels.

10. A method according to claim 9 wherein said one or more channels comprise one or more of image planes or processed versions of image planes.

11. A method according to claim 9 wherein said target neural network comprises a gender classifier for indicating a gender of a subject of an image.

12. A method according to claim 1 comprising providing pairs of samples from said first batch of samples of a given class to respective instances of a generative neural network, each instance of said generative neural network combining said pairs of samples and providing a variant of said samples in accordance with the parameters of said generative neural network.

13. A non-transitory computer program product comprising a computer readable medium storing computer executable instructions that, when executed, configure a computing device to perform operations comprising:
  inputting a first batch of samples to a generative neural network;
  outputting, by the generative neural network, one or more variants of at least one sample in the first batch of samples based at least in part on a parameter of the generative neural network;
  determining a first loss function for the generative neural network based at least in part on comparing the one or more variants produced by the generative neural network to another sample;
  selecting a proportion of the one or more variants and one or more samples in the first batch of samples for inclusion in a second batch of samples based at least in part on the first loss function for the generative neural network;
  inputting the second batch of samples to a target neural network, the proportion varying from the second batch of samples to a third batch of samples;
  determining a second loss function for the target neural network by comparing an output of the target neural network to a target value for the target neural network;
  updating a parameter for the target neural network based at least in part on the second loss function; and
  updating the parameter for the generative neural network based at least in part on the first loss function and the second loss function.

14. A non-transitory computer program product of claim 13, wherein the first batch of samples comprises a label identifying a class for at least one sample in the first batch of samples.

15. A non-transitory computer program product of claim 13, the operations further comprising:
  determining a probability for inputting the one or more variants determined by the generative neural network in the second batch of samples; and
  inputting the one or more variants in the second batch of samples based at least in part on the probability.

16. A computer device comprising:
hardware programmed to:
  input a first batch of samples to a generative neural network;
  output, by the generative neural network, one or more variants of one or more samples in the first batch of samples based at least in part on parameters of the generative neural network;
  determine a first loss function for the generative neural network based at least in part on comparing the one or more variants produced by the generative neural network to at least one of the one or more samples in the first batch of samples;
  determine to include the one or more variants or the one or more samples in a second batch of samples based at least in part on a probability;
  input a proportion of the one or more variants and the one or more samples in the second batch of samples to a target neural network, the proportion varying from the second batch of samples to a third batch of samples;
  determine a second loss function for the target neural network by comparing outputs of instances of the target neural network to one or more targets for the target neural network;
  update parameters for the target neural network based at least in part on the second loss function; and
  update the parameters for the generative neural network based at least in part on the first loss function and the second loss function.

17. A computer device of claim 16, further comprising a selector component located between the generative neural network and the target neural network to select the one or more variants for inclusion in the second batch of samples based at least in part on the first loss function for the generative neural network.

18. A computer device of claim 17, wherein the selector component to select the one or more variants for inclusion in the second batch of samples is further based at least in part on the probability.

* * * * *